UNITED STATES PATENT OFFICE.

HENRY C. MILLIGAN, OF BROOKLYN, ASSIGNOR TO THE IRON CLAD MANUFACTURING COMPANY, OF NEW YORK, N. Y.

ENAMELED IRONWARE.

SPECIFICATION forming part of Letters Patent No. 386,023, dated July 10, 1888.

Application filed March 25, 1884. Serial No. 125,493. (No specimens.)

*To all whom it may concern:*

Be it known that I, HENRY C. MILLIGAN, of Brooklyn, in the county of Kings and State of New York, have invented certain new and useful Improvements in Enameled Ironware; and I do hereby declare that the following is a full, clear, and exact description thereof.

My invention relates to certain new and useful improvements in the manufacture of enameled ironware resulting from the process described and claimed in an application for Letters Patent filed by me in the United States Patent Office on the 6th day of September, A. D. 1883, on which Letters Patent No. 296,206, of April 1, 1884, have since been granted. In these Letters Patent I have described a process by which good results may be obtained; but as other processes might be employed my present invention has for its object a new and useful improvement in enameled ironware *per se;* and it consists of a thin glaze to be fused upon the surface of the iron, and having embodied in it a sufficient amount of alkali to neutralize the effect of any boracic or equivalent acid, whereby the usual or well-known mottles or spots are avoided and a product obtained which has a thin coating of a practically uniform color, free from spots or mottles; and my invention further consists of a new and improved article of manufacture—viz., thin uncolored enameled ironware of practically plain appearance and free from spots or mottles.

In the production of this ware I have found that the process described in my Letters Patent No. 296,206 accomplishes good results; and in order that those skilled in the art may know how to make the same I will here state the manner in which I have accomplished the purpose of my present invention.

I first prepare the surface of the iron to be coated by treating it in any well-known manner to render it chemically clean and ready to be dipped in or coated with my improved glaze. The glaze is made in the form of a paste by mixing the usual ingredients, substantially omitting pigments or opacity-producing agents, then fusing and grinding the same, and subsequently adding a sufficient additional quantity of alkali to neutralize any boracic or equivalent acid which might be present in the paste. I determine when the necessary amount or quantity of alkali has been added by using litmus papers and dipping the same in the paste, the absence of any acid being denoted by the condition of the paper when removed. When the test denotes the complete neutralization of all acid, I then dip the iron in the paste, and thus give it a thin coating. The iron thus coated is then allowed to dry sufficiently, and finally placed within a "muffle" and the coating-paste fused thereon.

The formula I have used with good results is fully stated in my Letters Patent hereinbefore referred to, and which may be consulted for a full understanding of the same.

In conclusion, I remark, as I have already taken occasion to state in my aforesaid Letters Patent, that I wish it to be understood that I am aware that it is not new, broadly, to incorporate with the usual glaze compound after it has been duly mixed an additional quantity of alkali. My improved glaze differs from what has before been employed in that, after the ingredients employed to form a glaze have been mixed and compounded, there is incorporated with said compound an additional quantity of alkali or equivalent agent, sufficient to neutralize the acid resulting from the first admixture. I also wish it to be understood that I am aware that it is not new, in a broad sense, to produce enameled ware in which mottles or spots are invisible, for I know that what is known as "white enamel ware" has been made; but in all such products the spots are concealed by the thickening of the coat of enamel, or by mixing with it a suitable pigment in quantity to disguise the prevailing spots. The thickening of the enameled coat is objectionable on many accounts, mainly because a thick enamel is extremely liable to chip and break, thus destroying the value and utility of the article to which it is applied, besides which, as heretofore practiced, the operation of thickening the enamel imparts opacity to it. The use of pigments in quality and quantity sufficient to disguise spots or mottles which would otherwise be apparent is objectionable for many reasons. Many pigments are deleterious to health, and whether noxious or not, they, when used in quantities sufficient to disguise existing spots or mottles, destroy the transparent or translucent character of the enamel and impart to it an opaque and dead or pallid appearance, which detracts from its value and interferes with its sale and general use. I lay no claim to these goods.

My invention relates to what is known to those skilled in the art as "thin enameled ware," in contradistinction to thick enameled goods, and is directed to the production of a new species of such thin enameled ware—viz., ware having an enamel, first, of that transparency or translucency which belongs only to thin enameled ware; second, of practically plain appearance throughout; third, uncolored in the sense that it is substantially devoid of opacity-producing agents, or, in other words, is free from any opacity-imparting pigment or coloring agent in character and quantity sufficient to cover up spots or mottles, if any should exist, or to destroy the essentially thin and translucent characteristics of the coating; fourth, and free from spots or mottles, not in the sense that the mottles or spots are covered up or disguised, but in the sense that they are originally absent.

What therefore I claim as new and of my invention is—

1. A "glaze" adapted to be applied to and fused upon the surface of iron, composed of suitable ingredients to form a glaze, and having added thereto after it has been compounded an additional quantity of alkali or other equivalent agent sufficient to neutralize the acid or equivalent resulting from the first admixture, substantially as hereinbefore set forth.

2. As a new article of manufacture, thin uncolored enameled ironware of practically plain appearance and free from spots or mottles, as hereinbefore set forth.

HENRY C. MILLIGAN.

In presence of—
C. AUGUSTUS HAVILAND,
FRANCIS T. CHAPLAIN.